(12) United States Patent
Hong et al.

(10) Patent No.: US 7,573,702 B2
(45) Date of Patent: Aug. 11, 2009

(54) DISPLAY DEVICE

(75) Inventors: Lin-Yun Hong, Shenzhen (CN); Hsuan-Chen Chen, Taipei Hsien (TW); Chien-Li Tsai, Taipei Hsien (TW); Chun-Chi Liang, Taipei Hsien (TW); Ke-Cheng Lin, Taipei Hsien (TW); Peng Zhao, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 34 days.

(21) Appl. No.: 11/563,148

(22) Filed: Nov. 25, 2006

(65) Prior Publication Data

US 2007/0165369 A1    Jul. 19, 2007

(30) Foreign Application Priority Data

Jan. 13, 2006  (CN)  .................. 2006 1 0032964
Feb. 25, 2006  (CN)  .................. 2006 2 0055612

(51) Int. Cl.
  *H05K 5/00*  (2006.01)
  *H05K 7/00*  (2006.01)
  *G02F 1/1333*  (2006.01)

(52) U.S. Cl. .................. 361/679.26; 361/679.27; 349/58; 349/59; 349/60

(58) Field of Classification Search .................. 361/681, 361/679.26, 679.27; 349/58–60
See application file for complete search history.

(56) References Cited

U.S. PATENT DOCUMENTS

| 6,919,937 | B2 * | 7/2005 | Kim et al. | ...................... 349/58 |
| 6,989,986 | B2 * | 1/2006 | Kumagai et al. | ............ 361/681 |
| 7,002,792 | B2 * | 2/2006 | Han et al. | .................... 361/681 |
| 7,118,267 | B2 * | 10/2006 | Li et al. | ...................... 362/632 |
| 7,420,798 | B2 * | 9/2008 | Takahashi | .................... 361/681 |
| 2003/0103173 | A1 * | 6/2003 | Satonaka | ...................... 349/58 |
| 2003/0189681 | A1 * | 10/2003 | Han et al. | ...................... 349/58 |
| 2004/0196413 | A1 * | 10/2004 | Satonaka | ...................... 349/58 |
| 2005/0073624 | A1 * | 4/2005 | Lee et al. | ...................... 349/58 |
| 2005/0105011 | A1 * | 5/2005 | An | ............................... 349/58 |
| 2005/0122738 | A1 |  | 6/2005 | Li et al. |
| 2007/0211416 | A1 * | 9/2007 | Zhang et al. | ................ 361/681 |

FOREIGN PATENT DOCUMENTS

CN        1526128 A      9/2004

* cited by examiner

*Primary Examiner*—Jayprakash N Gandhi
*Assistant Examiner*—Anthony M Haughton
(74) *Attorney, Agent, or Firm*—Wei Te Chung

(57) ABSTRACT

A display device includes a frame defining an opening, a shell, and a display panel installed between the frame and the shell. The display panel is viewable via the opening of the frame. A latch is formed on the frame. A fixing portion is formed on the shell and slidably engaged with the latch of the frame for slidably fixing the shell to the frame. A plurality of fasteners extends through the frame to engage with the shell to thereby fasten the frame and the shell together.

8 Claims, 13 Drawing Sheets

DISPLAY DEVICE

BACKGROUND OF THE INVENTION

1. Field of the Invention

The present invention relates to a display device, and more particularly to a display device having a changeable shell.

2. Description of Related Art

Typically, a display device of a portable computer includes a frame with an opening, a liquid crystal display (LCD) panel viewable via the opening of the frame, and a shell. The LCD panel is held in the shell with a plurality of screws, and the frame is typically fixed to the shell by engagement of a plurality of hooks formed on the shell and frame respectively.

To detach the shell from the frame, the frame is typically deformed to disengage the hooks. However, the frame may be damaged due to excessive deformation.

What is needed, therefore, is a display device which facilitates assembling and disassembling.

SUMMARY OF THE INVENTION

An exemplary display device includes a frame with an opening, a shell, and a display panel disposed between the frame and the shell. The display panel is viewable through the opening of the frame. A latch is formed on the frame. A fixing portion is formed on the shell and slidably engagable with the latch of the frame for slidably fixing the shell to the frame. A plurality of fasteners extends through the frame to engage with the shell to thereby fasten the frame and the shell together.

Other advantages and novel features will become more apparent from the following detailed description of preferred embodiments when taken in conjunction with the accompanying drawings, in which:

DETAILED DESCRIPTION OF THE INVENTION

Figure 1:
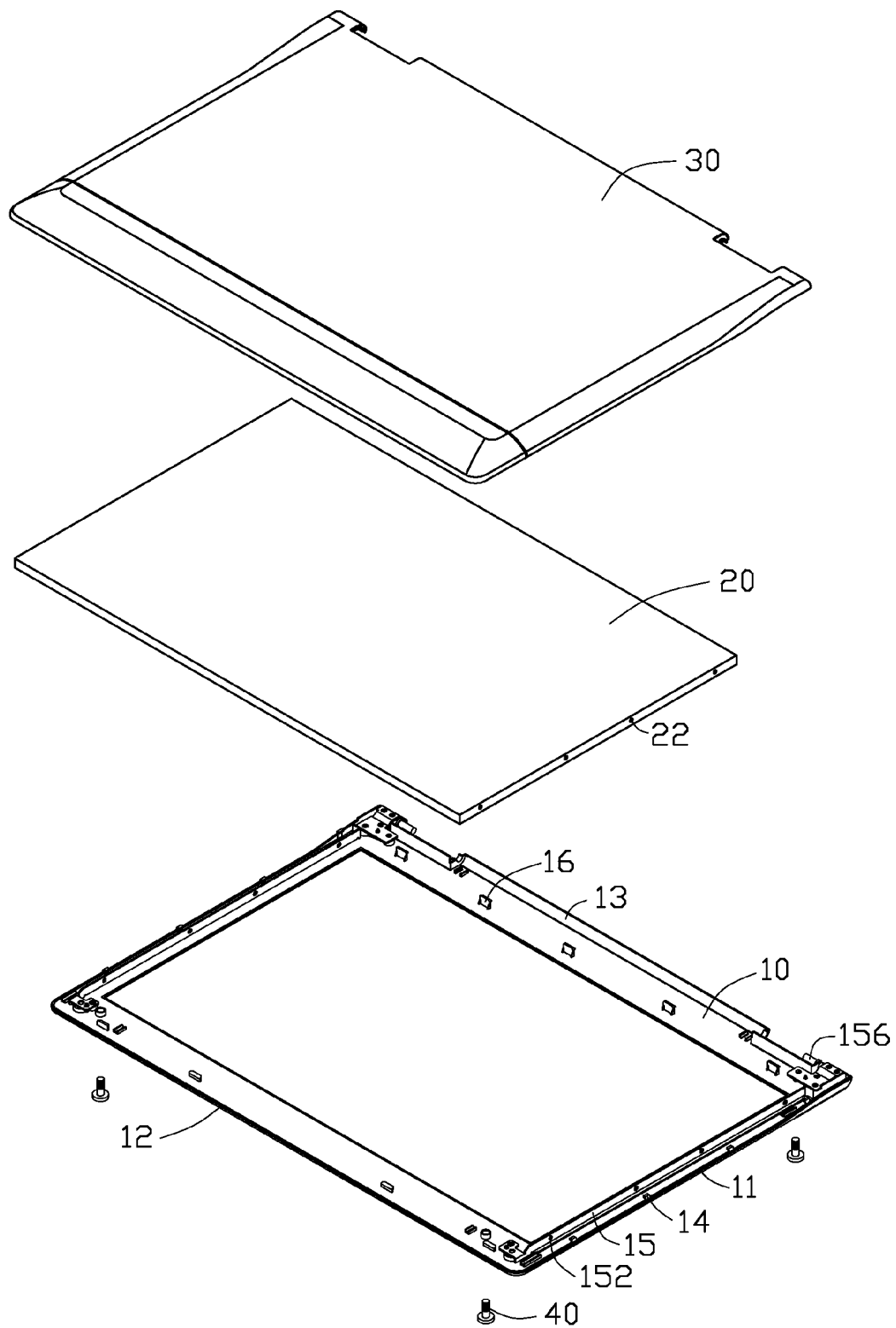
FIG. 1 is an exploded, isometric view of a display device in accordance with a first embodiment of the present invention, the display device including a frame, a shell, and an LCD panel.

Referring to FIG. 1, a display device is provided in accordance with a first preferred embodiment of the present invention for a portable computer. The display device includes a frame 10 with an opening, a liquid crystal display (LCD) panel 20 defining a plurality of locking holes 22 in opposite sides thereof, a shell 30, and a plurality of fixing members 40. In this embodiment, the fixing members 40 are screws.

Figure 2:
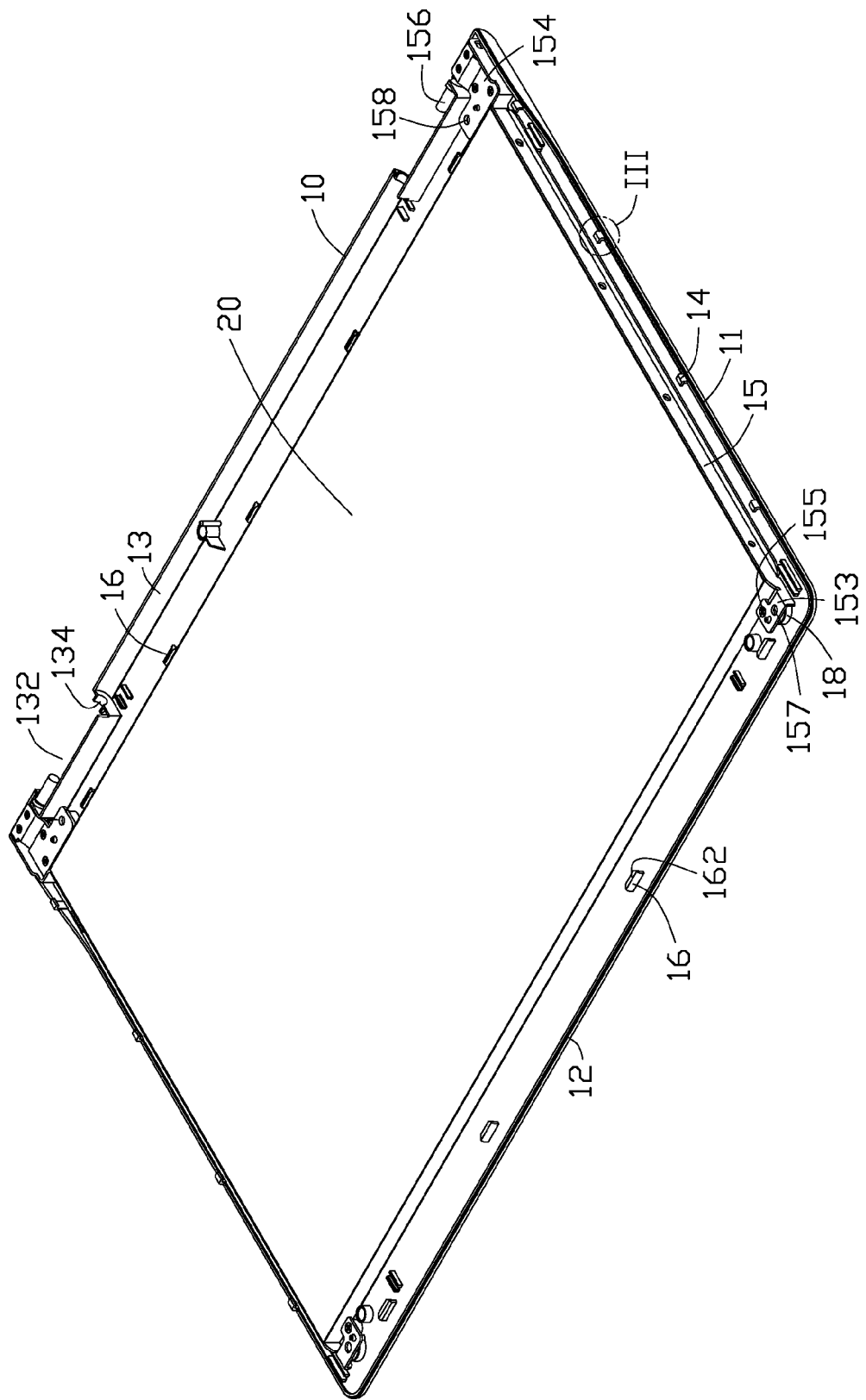
FIG. 2 is an enlarged assembled view of the frame and the LCD panel of FIG. 1.
Figure 3:
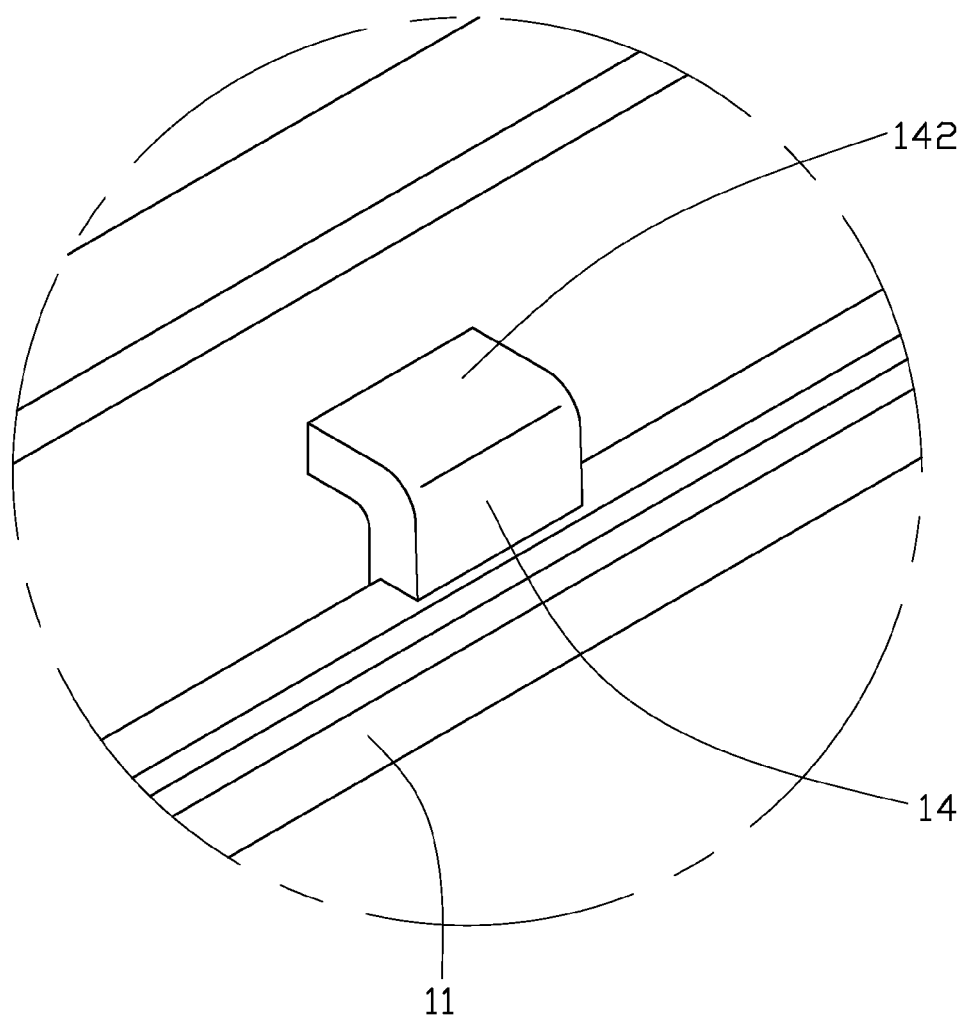
FIG. 3 is an enlarged view of circled portion II of FIG. 2.

Referring also to FIGS. 2 and 3, the frame 10 includes two opposite sidewalls 11, a front wall 12, and a rear wall 13. A plurality of spaced first latches 14 is formed on each sidewall 11, and a latching portion 142 extends from each first latch 14 toward the opposite sidewall 11. A plurality of hooks 16 is formed on the frame 10 adjacent the front wall 12 and the rear wall 13 respectively, and a hooking portion 162 extends from each hook 16 toward the rear wall 13. Four protrusions 18 are formed on four corners of the frame 10 respectively, and each protrusion 18 has a through hole defined therein. Two openings 132 are defined inward in the rear wall 13 adjacent the sidewalls 11 respectively, and two curved grooves 134 are defined in the rear wall 13 communicating with two sides of each opening 132 respectively. Two mounting plates 15 are installed in the frame 10 adjacent the sidewalls 11 respectively. The mounting plates 15 are parallel to the sidewalls 11 respectively, and each mounting plate 15 defines a plurality of mounting holes 152 corresponding to the locking holes 22 of the LCD panel 20. A first mounting portion 153 and a second mounting portion 154 are formed on two free ends of each mounting plate 15 and suspended over the protrusions 18 respectively. Through holes 157, 158 are defined in the first mounting portion 153 and in the second mounting portion 154 of each mounting plate 15 respectively, corresponding to the protrusions 18. A plurality of screws 155 extend through the first and second mounting portions 153, 154, for fixing the mounting plates 15 to the frame 10. A pivot 156 extends perpendicularly from the second mounting portion 154 of each mounting plate 15, and is exposed in the corresponding opening 132 through the corresponding groove 134 of the rear wall 13, for rotatably fixing the frame 10 to a base unit of the portable computer.

Figure 4:
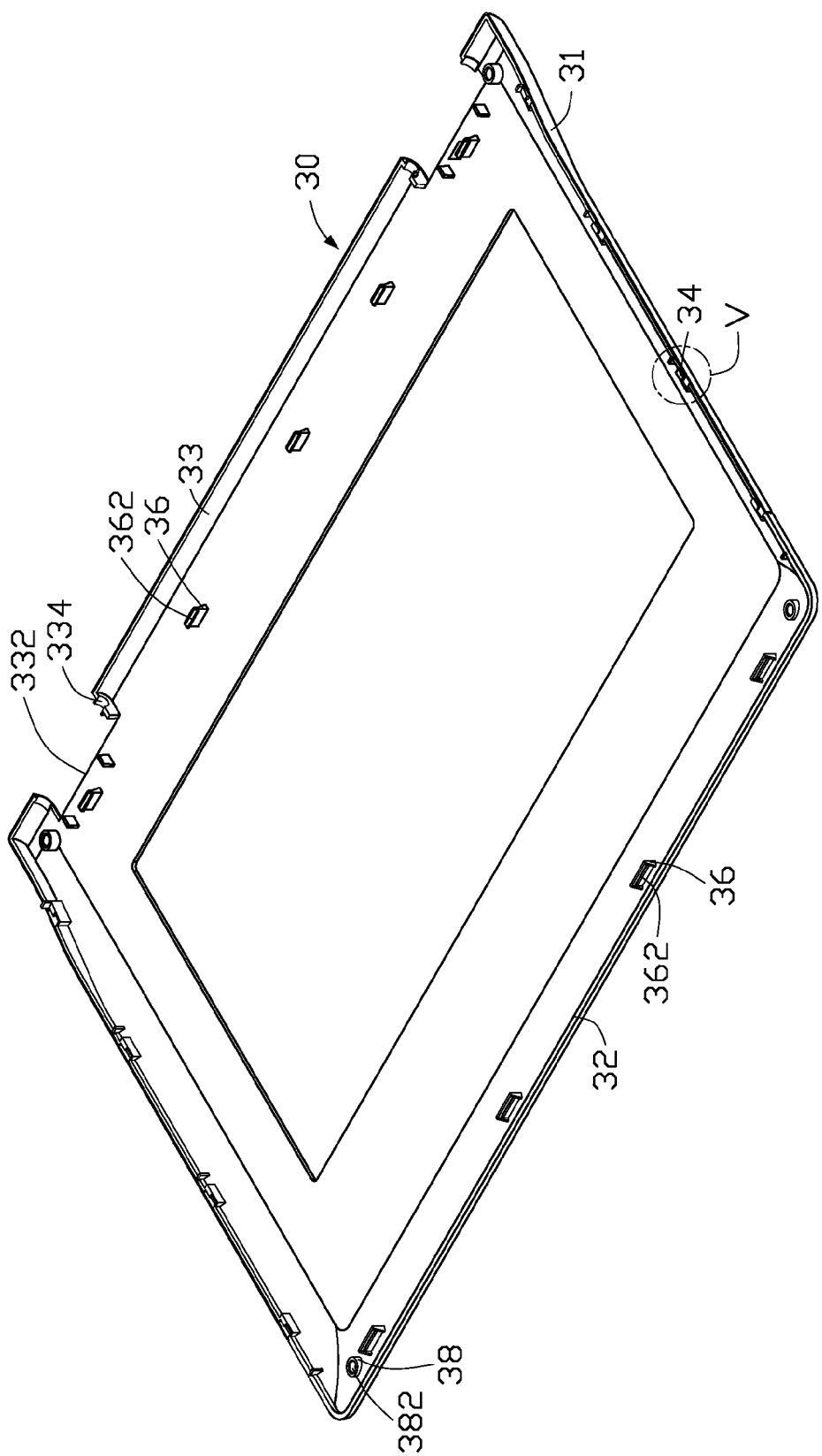
FIG. 4 is an inverted, enlarged view of the shell of FIG. 1.
Figure 5:
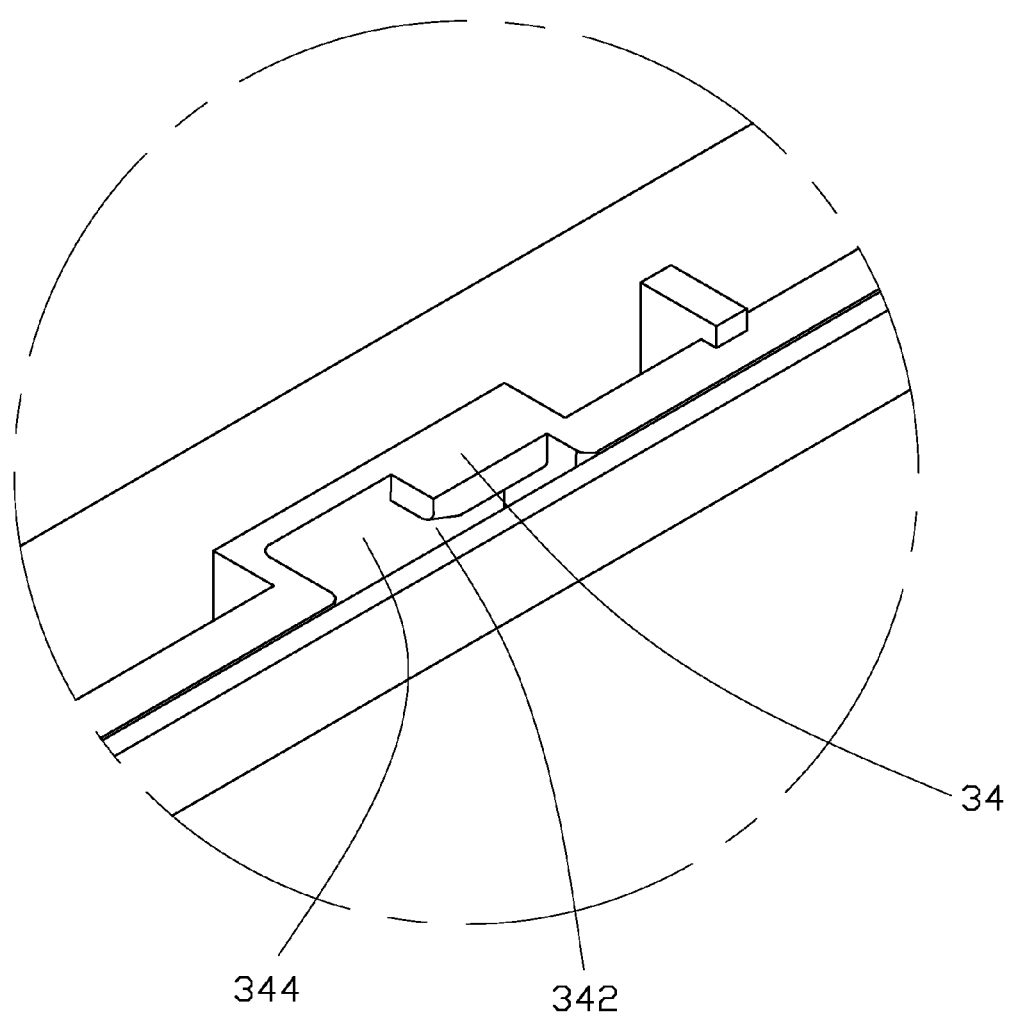
FIG. 5 is an enlarged view of circled portion V of FIG. 4.

Referring also to FIGS. 4 and 5, the shell 30 includes two opposite sidewalls 31, a front wall 32, and a rear wall 33. A plurality of first fixing portions 34 is formed on each sidewall 31, corresponding to the first latches 14 of the frame 10. A generally L-shaped slot 342 is defined in each first fixing portion 34, and a receiving space 344 is defined in the first fixing portion 34 above the slot 342. A wide section of the slot 342 is nearer to the front wall 32 of the shell 30 than a narrow section thereof. A plurality of hooks 36 are formed on the shell 30 adjacent the front wall 32 and the rear wall 33 respectively, and a hooking portion 362 extends from each hook 36 toward the front wall 32 of the shell 30. Two openings 332 are defined inward in the rear wall 33 of the shell 30 corresponding to the openings 132 of the frame 10, and two curved grooves 334 are defined in the rear wall 33 communicating with two sides of each opening 332 respectively. Four protrusions 38 are formed on four corners of the shell 30 respectively, and each protrusion 38 has a threaded hole 382 defined therein.

Figure 6:
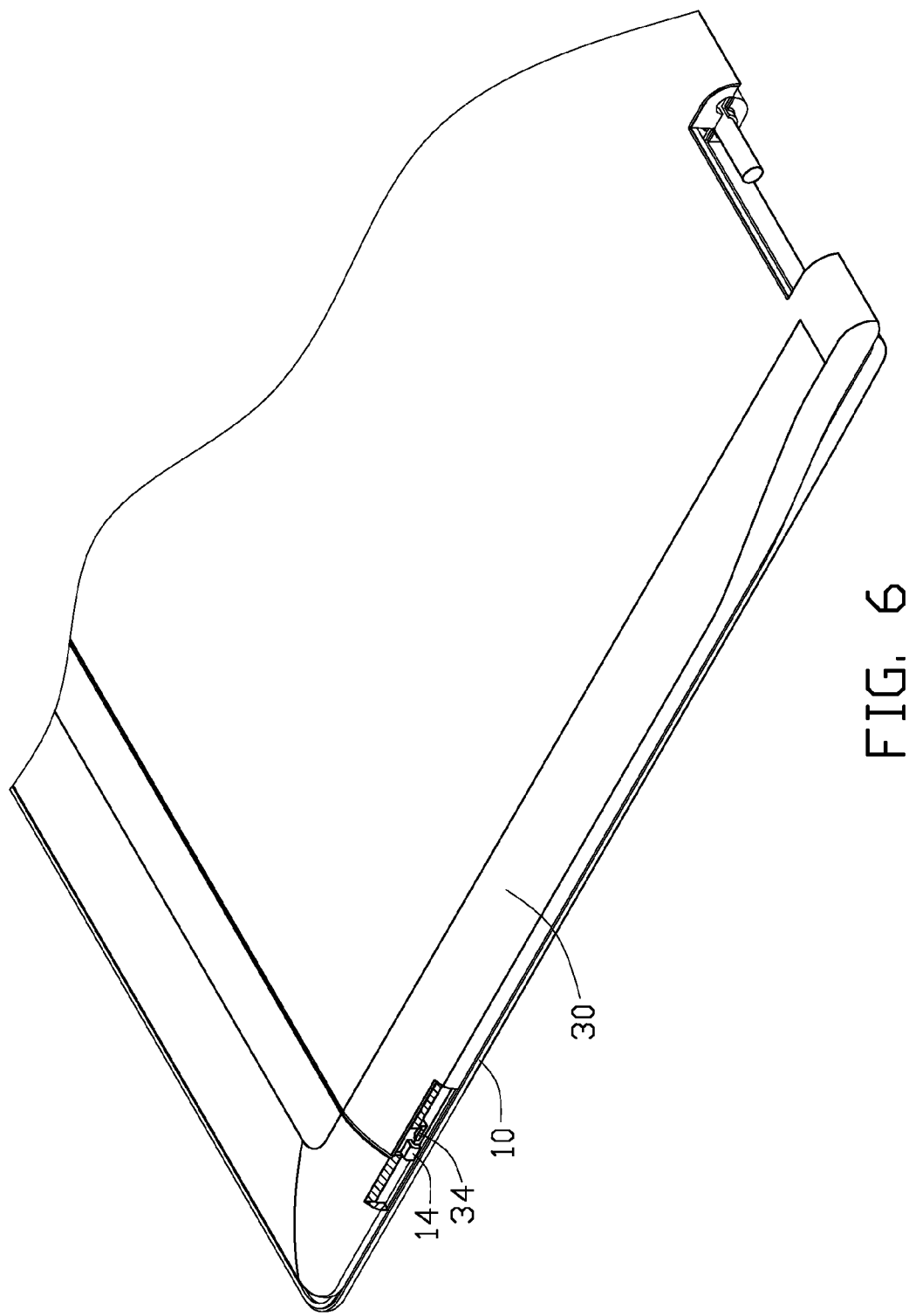
FIG. 6 is a preliminarily assembled view of FIG. 1, with a portion cut away showing a first state of a first latch mechanism.
Figure 7:
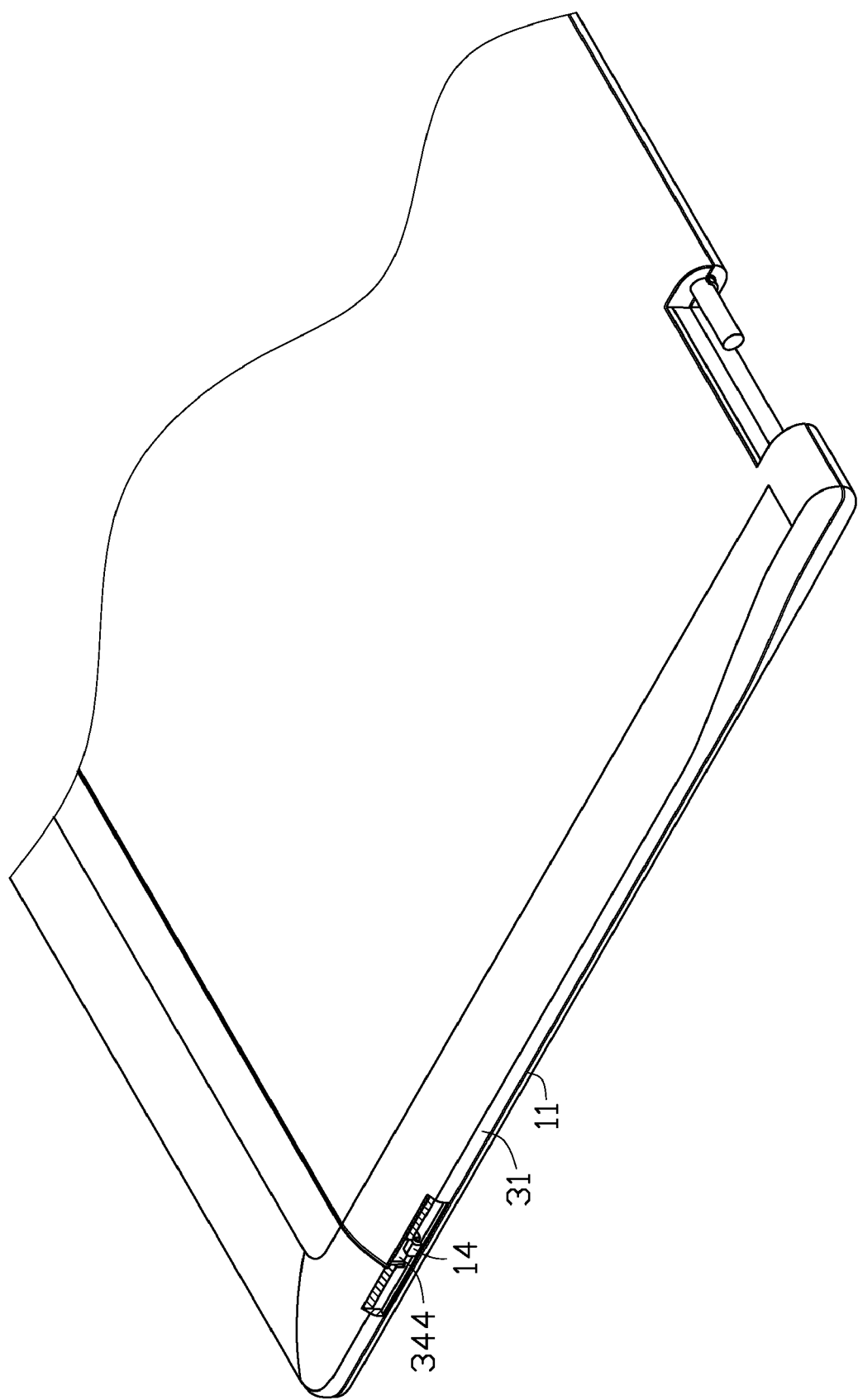
FIG. 7 is a fully assembled view of FIG. 1, with a portion cut away showing a second state of the first latch mechanism.

Referring to FIGS. 2, 6, and 7, in assembly, the LCD panel 20 is disposed on the frame 10 between the mounting plates 15. A plurality of screws is extended through the mounting holes 152 of the mounting plates 15 and screwed in the corresponding locking holes 22 of the LCD panel 20, to fix the LCD panel 20 to the mounting plates 15. One side of the LCD panel 20 is exposed in the opening of the frame 10. Then, the shell 30 is fixed to the frame 10 to cover the other side of the LCD panel 20. The latching portions 142 of the first latches 14 of the frame 10 enter the slots 342 of the corresponding first fixing portions 34 of the shell 30 via the wide sections of the slots 342 respectively, and are received in the receiving spaces 344 of the shell 30 respectively. The shell 30 is pushed a distance toward the front wall 12 of the frame 10. The first latches 14 of the frame 10 engage in the narrow sections of the slots 342 of the corresponding first fixing portions 34, and the hooks 36 of the shell 30 engage with the corresponding hooks 16 of the frame 10. After that, the fixing members 40 are extended through the through holes of the corresponding protrusions 18 of the frame 10 and the corresponding through holes 157, 158 of the mounting plates 15, to engage in the holes 382 of the corresponding protrusions 38 of the shell 30. The shell 30 is thus fixed to the frame 10.

To detach the shell 30 from the frame 10, the fixing members 40 are unscrewed. The shell 30 is pushed away from the front wall 12 of the frame 10, the first latches 14 of the frame 10 disengage from the narrow sections and then enter the wide sections of the slots 342 of the corresponding first fixing portions 34. The hooks 36 of the shell 30 disengage from the corresponding hooks 16 of the frame 10. The shell 30 is lifted, the first latches 14 exit the slots 342 of the corresponding first fixing portions 34 of the shell 30, and the shell 30 can be removed.

In the first embodiment, the first latches 14 and the corresponding first fixing portions 34 cooperatively form a first latching mechanism for movably attaching the shell 30 to the frame 10.

Figure 8A:
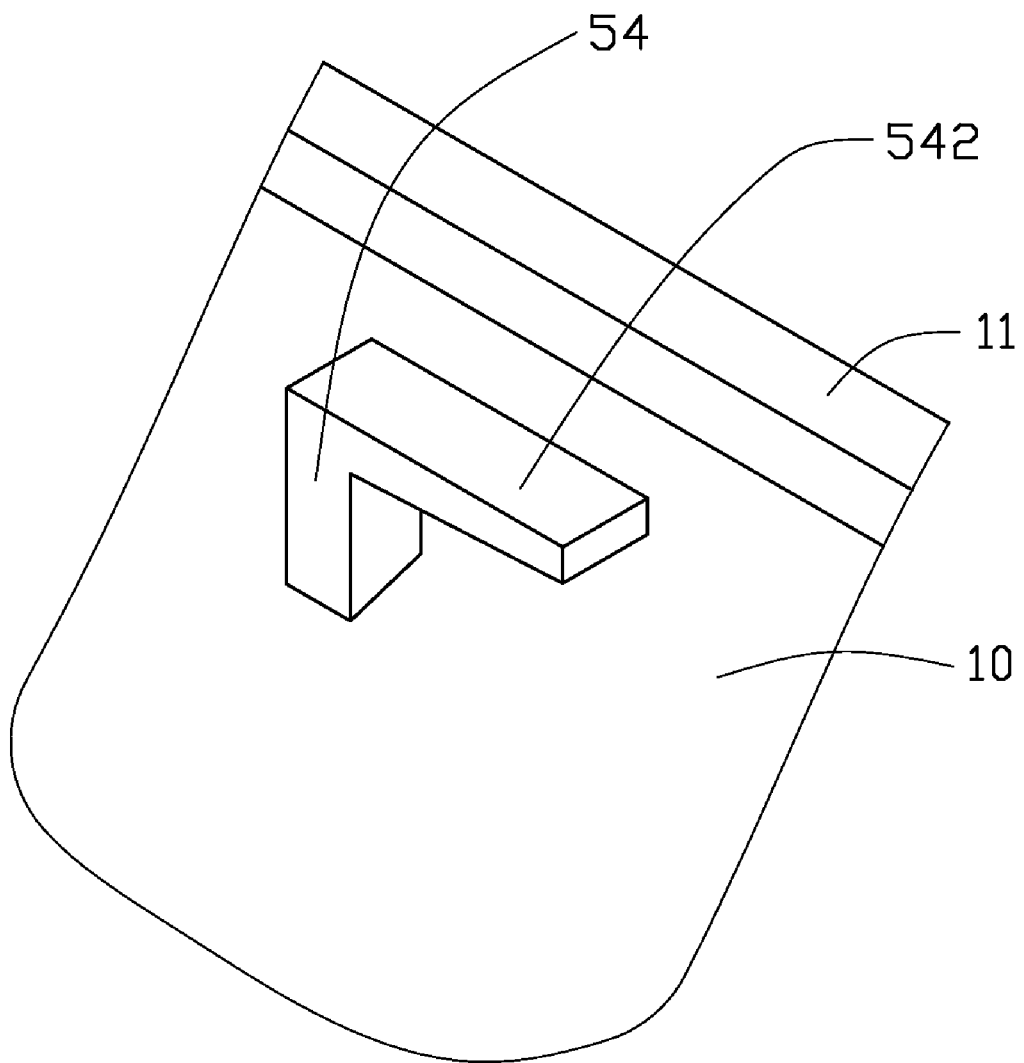
FIGS. 8A and 8B show a second latch mechanism used to attach the shell to the frame.
Figure 8B:
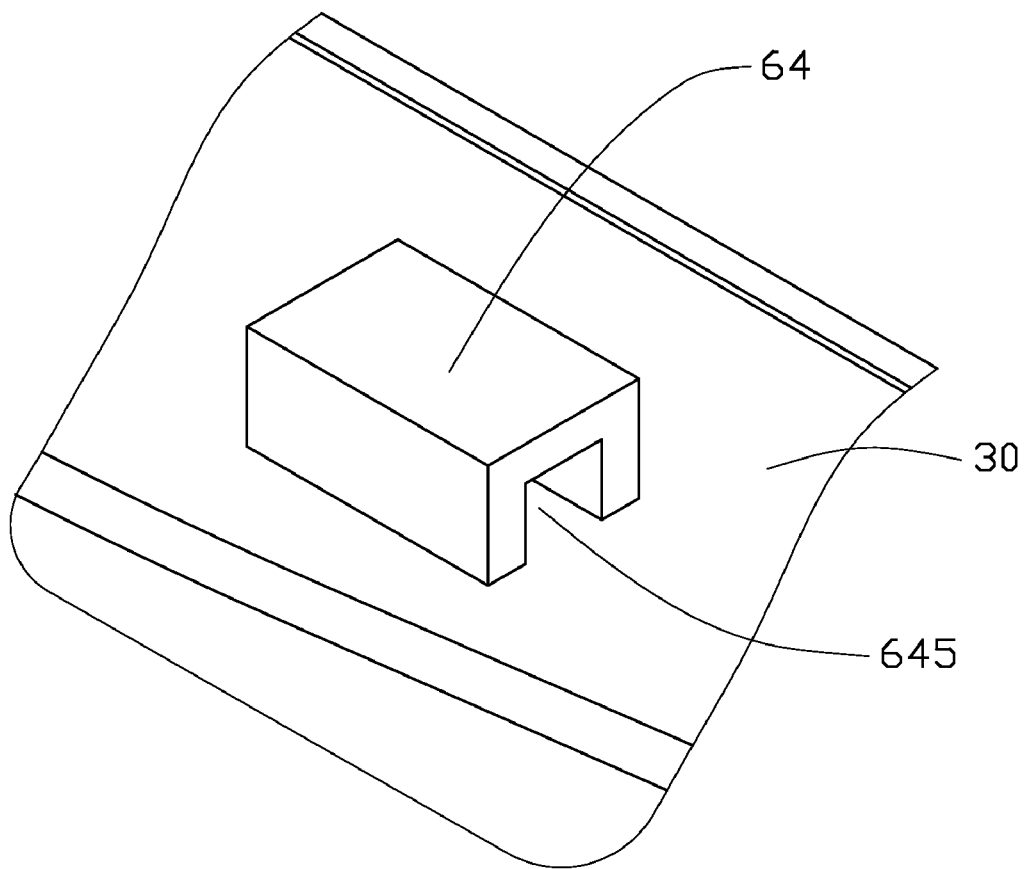

Referring further to FIGS. 8A and 8B, a second latching mechanism is provided to attach the frame 10 to the shell 30, which can be used alone or in combination with the first latching mechanism of the first embodiment. The second latching mechanism includes an L-shaped second latch 54, and a second fixing portion 64. The second latch 54 includes a base portion extending up from the frame 10, and a cantilevered portion 542 extending perpendicularly from the base portion and generally parallel to the sidewall 11 of the frame 10. The second fixing portion 64 is formed on the shell 30, which includes a parallelepiped body having a generally U-shaped cross section, and a hole 645 is defined in the body for receiving the cantilevered portion 542 of the second latch 54.

Figure 9A:
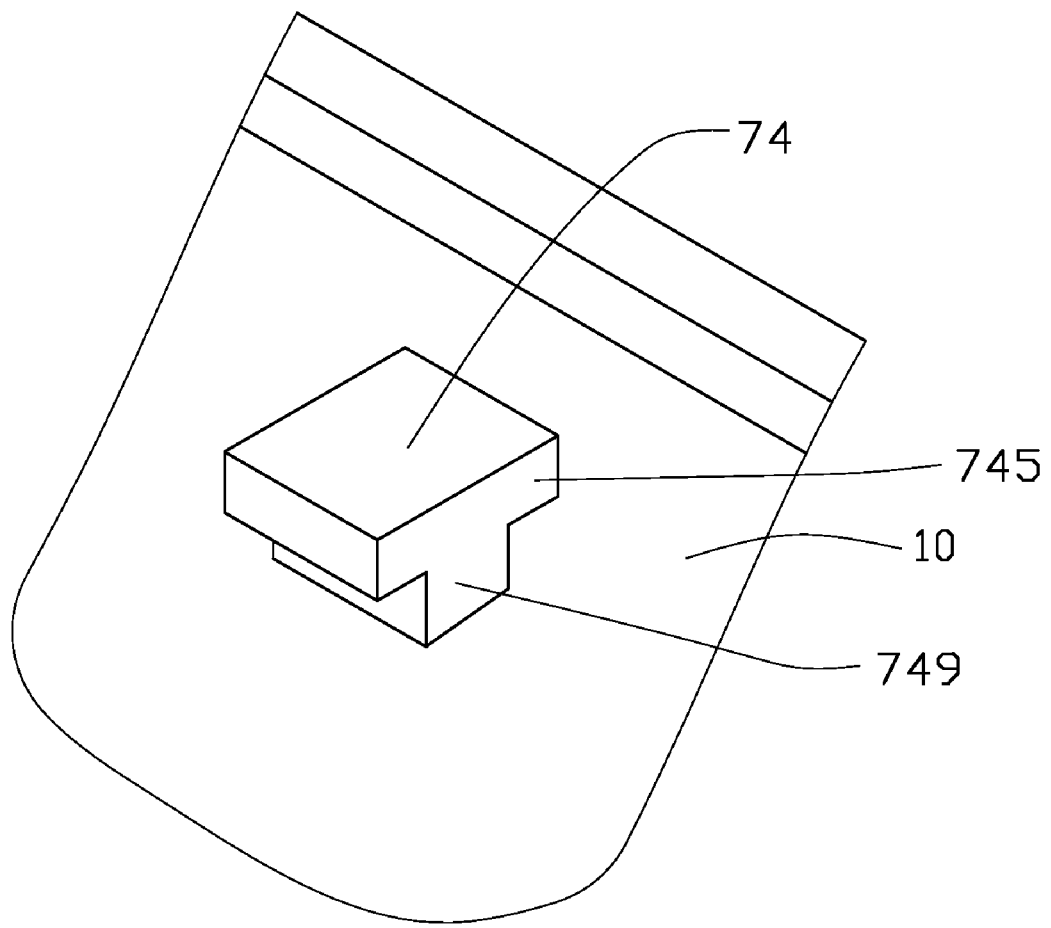
FIGS. 9A and 9B show a third latch mechanism used to attach the shell to the frame.
Figure 9B:
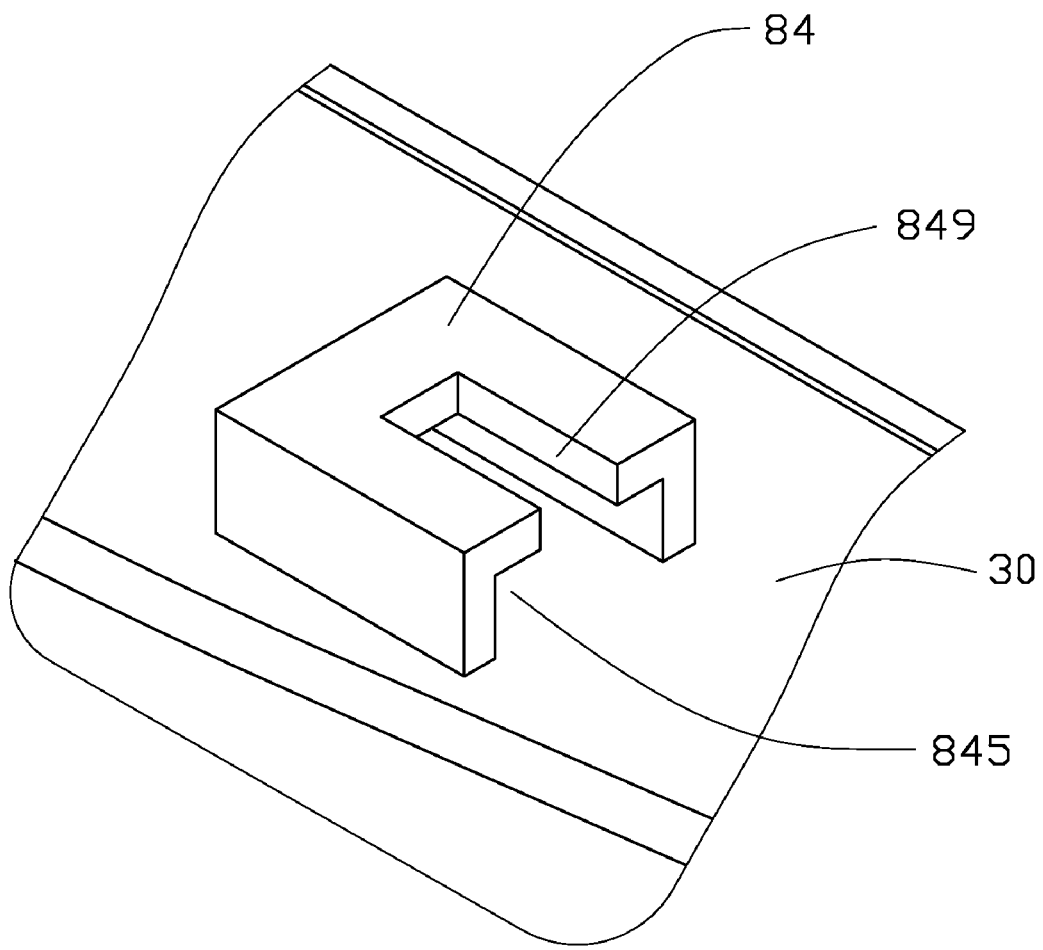

FIGS. 9A and 9B show a third latch mechanism, which includes a third latch 74 formed on the frame 10, and a third fixing portion 84 formed on the shell 30. The third latch 74 includes a first portion 749 extending up from the frame 10, and a second portion 745 disposed on the first portion 749 for cooperatively defining a generally T-shaped configuration. The third fixing portion 84 includes a parallelepiped body defining a hole 845 for receiving the second portion 745 of the third latch 74, and a slot 849 in communication with the hole 845 for receiving the first portion 749 of the third latch 74. The slot 849 is configured to complement the T-shape of the third latch 74 preventing movement of the third latch 74 in unwanted directions.

Figure 10A:
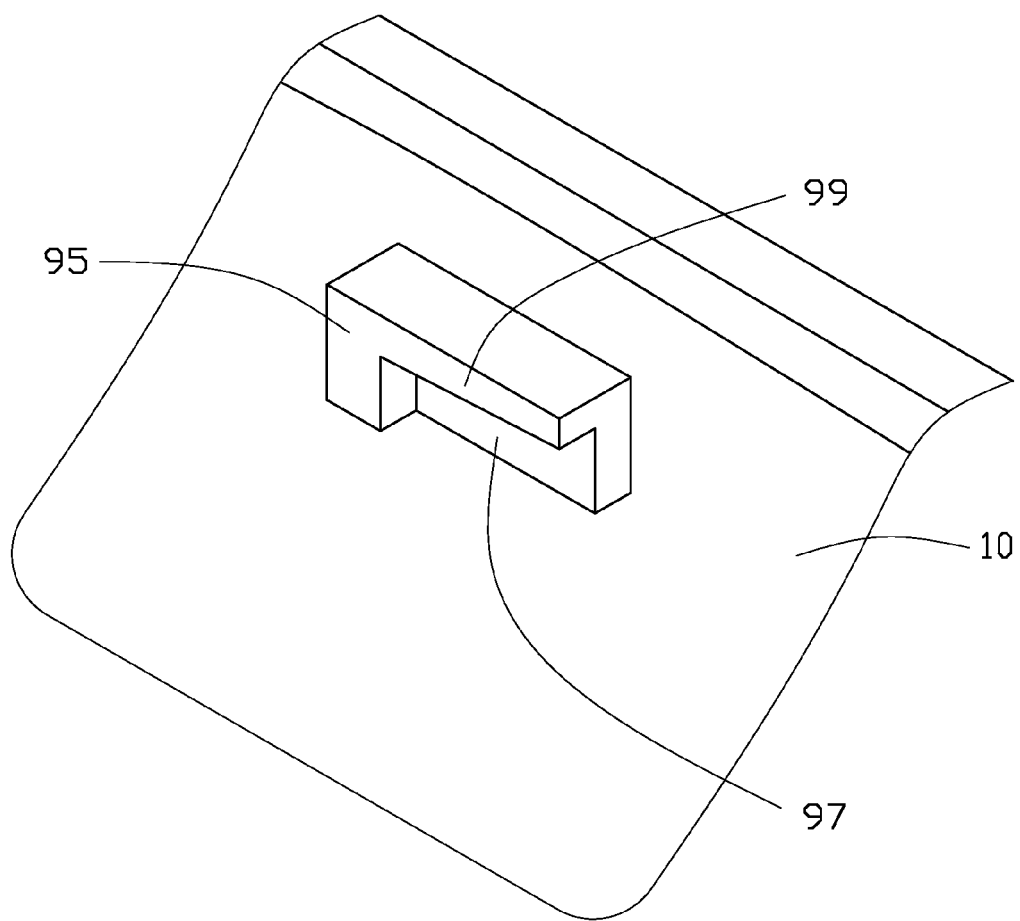
FIGS. 10A and 10B show a fourth latch mechanism used to attach the shell to the frame.
Figure 10B:
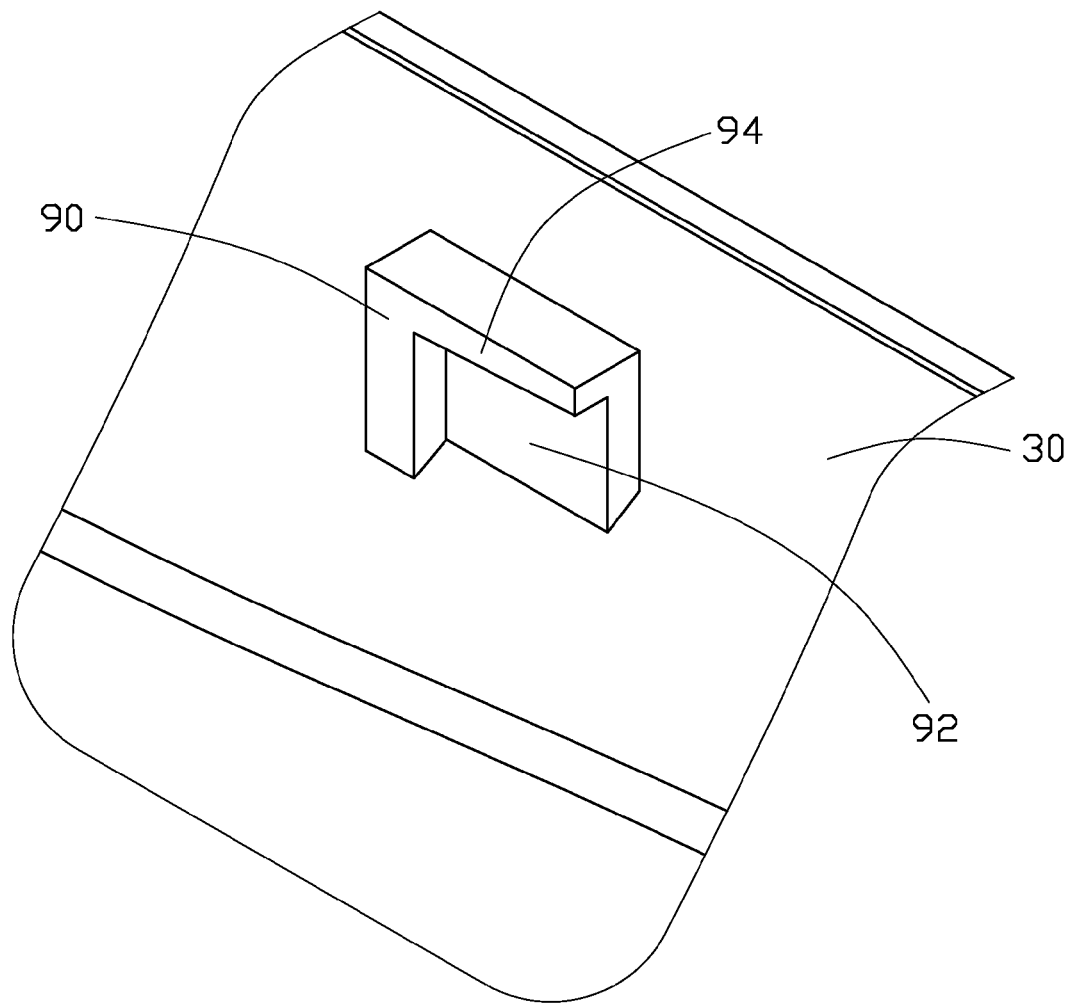

FIGS. 10A and 10B show a fourth latch mechanism, which includes a fourth latch 95 formed on the frame 10, and a fourth fixing portion 90 formed on the shell 30. The fourth latch 95 defines a cutout 97 adjoining the frame 10, and a latching portion 99 is formed on and cantilevered over the frame 10. The fourth fixing portion 90 has a generally same construction with the fourth latch 95, which includes a cutout 92 adjoining the shell 30, and a fixing section 94 cantilevered over the shell 30. In use, the latching portion 99 and the fixing section 94 enter corresponding cutouts 92, 97 and engage with each other to mount the shell 30 to the frame 10.

The first to fourth latching mechanisms can be used alone or in combination with others to movably attach the shell 30 to the frame 10.

It is believed that the present embodiments and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device comprising:
    a frame comprising a flat panel with an opening, a latch formed on an inside surface of the flat panel of the frame;
    a shell, a fixing portion formed on an inside surface of the shell and slidably engagable with the latch of the frame for slidably fixing the shell to the frame;
    a display panel disposed between the inside surfaces of the flat panel of the frame and the shell, and viewable through the opening of the frame; and
    a plurality of fasteners configured for fastening the frame and the shell together;
    wherein the frame further comprises opposite sidewalls perpendicularly formed on the flat panel, each of the sidewalls comprising a free end surface parallel with the flat panel, the latch is formed on the free end surface of one of the sidewalls and comprises a latching portion extending toward the other of the sidewalls, a generally L-shaped slot is defined in the fixing portion, a receiving space is defined in the fixing portion above the slot for receiving the latching portion of the latch when the latch engages with the fixing portion of the shell, the slot comprises a wide portion and a narrow portion, the wide portion of the slot functions as an entrance through which the latching portion enters the receiving space, and the narrow portion is configured for retaining the latching portion in the receiving space.

2. The display device as claimed in claim 1, wherein two opposite mounting plates are installed on the inside surface of the flat panel of the frame, and the display panel is attached between the mounting plates.

3. The display device as claimed in claim 2, wherein the shell and the frame are movable with respect to each other along a direction in which the mounting plates extends before the frame is securely fixed to the shell.

4. The display device as claimed in claim 1, wherein a plurality of screws is provided to fasten the shell to the frame.

5. A device for attaching a display panel, the device comprising:
    a frame comprising a flat panel, the flat panel comprising an inside surface;
    a shell comprising a flat panel comprising an inside surface cooperating with the inside surface of the flat panel of the frame to define a receiving space therebetween for receiving the display panel; and
    a latching mechanism comprising at least one latch formed on the inside surface of one of the frame and the shell, and at least one fixing portion formed on the inside surface of the other of the frame and the shell, the at least one latch and the at least one fixing portion being movable with respect to each other along a distance until being engagable with each other for fixing the shell to the frame;
    wherein the frame further comprises opposite sidewalls perpendicularly formed on the flat panel, each of the sidewalls comprising a free end surface parallel with the flat panel, the at least one latch is formed on the free end surface of one of the sidewalls and comprises a latching portion parallel with the flat panel extending toward the other of the sidewalls, a generally L-shaped slot is defined in the at least one fixing portion, a receiving space is defined in the at least one fixing portion above the slot for receiving the latching portion of the at least one latch when the latch engages with the fixing portion of the shell, the slot comprises a wide portion and a narrow portion, the wide portion of the slot functions as an entrance through which the latching portion enters the receiving space, and the narrow portion is configured for retaining the latching portion in the receiving space.

6. A display device comprising:
a frame comprising a flat panel with an opening, the flat panel comprising an inside surface;
a shell comprising a flat panel with an inside surface;
a display panel sandwiched between the inside surfaces of the flat panels of the frame and the shell and exposed through the opening;
a pair of latching mechanisms formed between the frame and the shell and disposed at opposite two sides of the opening respectively, each of the latching mechanisms comprising a latch formed at the inside surface of one of the frame and the shell and a fixing portion formed at the inside surface of the other of the frame and the shell, the fixing portion defining a slot comprising a wide portion configured for providing access to the latch to enter in the slot and a narrow portion configured for slidably engaging with latch; and
a plurality of fasteners configured for fastening the frame and the shell together after the latches engage in the narrow portions of the slots of the fixing portions, wherein
the latch is slidable from the narrow portion to the wide portion to be removed from the slot after the fastener is disengaged from the frame and the shell.

7. The display device as claimed in claim 6, wherein the shell and the frame have a rectangular configure, and a plurality of pair of hooks is formed between the frame and the shell at other two opposite sides of the opening, one of each pair of hooks being slidably engagable with the other of the pair of hooks.

8. The display device as claimed in claim 6, wherein a pair of mounting plates is secured on the inside surface of the flat panel of the frame on said opposite two sides of the opening respectively, a plurality of additional fasteners extending through holes defined in the mounting plates to secure in holes defined in the display panel whereby the mounting plates sandwich the display panel therebetween.

* * * * *